US012519756B2

(12) United States Patent
Mohandoss et al.

(10) Patent No.: US 12,519,756 B2
(45) Date of Patent: Jan. 6, 2026

(54) METHOD AND SYSTEM FOR MANAGING ANONYMIZED DATA USING BLOCKCHAIN NETWORK

(71) Applicant: INFOSYS LIMITED, Bangalore (IN)

(72) Inventors: Ramaswami Mohandoss, Bangalore (IN); Graceta Gnanaselvi Jesurajan, Bangalore (IN)

(73) Assignee: Infosys Limited, Bangalore (IN)

( * ) Notice: Subject to any disclaimer, the term of this patent is extended or adjusted under 35 U.S.C. 154(b) by 344 days.

(21) Appl. No.: 18/128,120

(22) Filed: Sep. 12, 2023

(65) Prior Publication Data

US 2024/0333691 A1 Oct. 3, 2024

(30) Foreign Application Priority Data

Mar. 29, 2023 (IN) .............................. 202341022919

(51) Int. Cl.
*H04L 29/06* (2006.01)
*H04L 9/00* (2022.01)
(Continued)

(52) U.S. Cl.
CPC ........ *H04L 63/0421* (2013.01); *H04L 9/0861* (2013.01); *H04L 9/321* (2013.01); *H04L 9/50* (2022.05)

(58) Field of Classification Search
CPC ... H04L 63/0421; H04L 9/0861; H04L 9/321; H04L 9/50; H04L 9/0891; H04L 63/06
See application file for complete search history.

(56) References Cited

U.S. PATENT DOCUMENTS 10,735,202 B2 * 8/2020 Jayachandran ....... H04L 9/3239
2019/0081950 A1 * 3/2019 Baracaldo Angel .... H04L 63/10
(Continued)

FOREIGN PATENT DOCUMENTS

CN 112688786 B 6/2021
CN 114928835 A 8/2022

OTHER PUBLICATIONS

Zaidi Sya, Shah MA, Khattak HA, Maple C, Rauf HT, El-Sherbeeny AM, El-Meligy MA. An Attribute-Based Access Control for IoT Using Blockchain and Smart Contracts. Sustainability. 2021; 13(19):10556. pp. 1-26. https://doi.org/10.3390/su131910556 (Year: 2021).*

(Continued)

*Primary Examiner* — Harunur Rashid
(74) *Attorney, Agent, or Firm* — Finnegan, Henderson, Farabow, Garrett & Dunner, LLP

(57) ABSTRACT

This disclosure relates to a method and a system for managing anonymized data across computing devices in a blockchain network. The method includes generating the blockchain network including a blockchain ledger based on a dataset associated with each of a plurality of end users. The method of generating the blockchain network includes constructing the blockchain ledger corresponding to the dataset associated with each of the plurality of end users; generating a unique ledger key corresponding to the dataset associated with each of the plurality of end users; and storing the dataset associated with each of the plurality of end users in the blockchain ledger based on the unique ledger key. The method further includes communicating a joining request to a second computing device for joining the blockchain network. The method further includes granting access to the second computing device to the dataset associated with the plurality of end users.

18 Claims, 10 Drawing Sheets

(51) Int. Cl.
  *H04L 9/08* (2006.01)
  *H04L 9/32* (2006.01)
  *H04L 9/40* (2022.01)

(56) References Cited

U.S. PATENT DOCUMENTS

2019/0165949 A1* 5/2019 Ramos ................ G06F 21/6254
2019/0370866 A1* 12/2019 Lawbaugh ......... G06Q 30/0277

OTHER PUBLICATIONS

Europe Patent Application No. 23165772.7, Extended European Search Report, dated Sep. 25, 2023.

* cited by examiner

METHOD AND SYSTEM FOR MANAGING ANONYMIZED DATA USING BLOCKCHAIN NETWORK

CROSS-REFERENCE TO RELATED APPLICATION

This application claims priority to Indian Patent Application No. 202341022919, filed on Mar. 29, 2023, which is hereby incorporated by reference in its entirety.

TECHNICAL FIELD

This disclosure relates generally to data management, and more particularly to a method and a system for managing anonymized data across computing devices in a blockchain network.

BACKGROUND

Data is the new oil, and every enterprise continue to use its data, particularly its consumer intelligence, for strategic purposes to expand their commercial potential. For this, many enterprises have started realizing that knowledge (or information) they possess about their consumer is incomplete and not sufficient. In particular, currently, the information about the consumer that any enterprise has is bound to a domain in which the enterprise operates. For instance, a retail major would understand the consumer's fashion sense, a Consumer Packaged Goods (CPGs) major would understand the consumer's taste, and a bank would understand the consumer's risk tolerance.

However, with rapid advancement in technology, enterprises understand that, to provide holistic experience to their end consumers, exchange of the information about the consumer is unavoidable. In today's world, exchange of consumer's information among enterprises is achieved through clean room (or safe room) cloud solutions in which an enterprise forms partnerships with other enterprises and each partner brings the customer information they possess, to a common restricted environment. In that environment, the enterprise identify overlapping customers from other partner enterprises and create's a holistic profile based on the information of the overlapping customers obtained from partner enterprises in order to engage customer's effectively. The creation of this environment, results in a highly constrained hub and spoke model. Further, building this highly constrained hub and spoke model requires a large operational overhead and is not scalable. There is, therefore, a need in the present state of art, for techniques to address the problem of exchanging consumer's information among enterprises.

SUMMARY

In one embodiment, a method of managing anonymized data across computing devices in a blockchain network is disclosed. In one example, the method may include generating the blockchain network including a blockchain ledger based on a dataset associated with each of a plurality of end users. The dataset associated with each of the plurality of end users is associated with a first computing device. The method of generating the blockchain network may include constructing the blockchain ledger corresponding to the dataset associated with each of the plurality of end users based on a set of customization settings and one or more criteria. The one or more criteria may be defined by the first computing device. The method of generating the blockchain network may include generating a unique ledger key corresponding to the dataset associated with each of the plurality of end users. The method of generating the blockchain network may include storing the dataset associated with each of the plurality of end users in the blockchain ledger based on the unique ledger key. Further, the method may include communicating a joining request to a second computing device for joining the blockchain network. Further, the method may include granting access to the second computing device to the dataset associated with the plurality of end users.

In one embodiment, a system for managing anonymized data across computing devices in a blockchain network is disclosed. In one example, the system may include a processor and a computer-readable medium communicatively coupled to the processor. The computer-readable medium may store processor-executable instructions, which, on execution, may cause the processor to generate the blockchain network including a blockchain ledger based on a dataset associated with each of a plurality of end users. The dataset associated with each of the plurality of end users may be associated with a first computing device. To generate the blockchain network, the processor-executable instructions, on execution, may further cause the processor to construct the blockchain ledger corresponding to the dataset associated with each of the plurality of end users based on a set of customization settings and one or more criteria. The one or more criteria may be defined by the first computing device. To generate the blockchain network, the processor-executable instructions, on execution, may further cause the processor to generate a unique ledger key corresponding to the dataset associated with each of the plurality of end users. To generate the blockchain network, the processor-executable instructions, on execution, may further cause the processor to store the dataset associated with each of the plurality of end users in the blockchain ledger based on the unique ledger key. The processor-executable instructions, on execution, may further cause the processor to communicate a joining request to a second computing device for joining the blockchain network. The processor-executable instructions, on execution, may further cause the processor to grant access to the second computing device to the dataset associated with the plurality of end users.

In one embodiment, a non-transitory computer-readable medium storing computer-executable instructions for managing anonymized data across computing devices in a blockchain network is disclosed. In one example, the stored instructions, when executed by a processor, cause the processor to perform operations including generating the blockchain network including a blockchain ledger based on a dataset associated with each of a plurality of end users. The dataset associated with each of the plurality of end users may be associated with a first computing device. To generate the blockchain network, the operations may further include constructing the blockchain ledger corresponding to the dataset associated with each of the plurality of end users based on a set of customization settings and one or more criteria. The one or more criteria may be defined by the first computing device. To generate the blockchain network, the operations may further include generating a unique ledger key corresponding to the dataset associated with each of the plurality of end users. To generate the blockchain network, the operations may further include storing the dataset associated with each of the plurality of end users in the blockchain ledger based on the unique ledger key. The operations may further include communicating a joining request to a second computing device for joining the blockchain network. The operations may further include granting access to the second computing device to the dataset associated with the plurality of end users.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
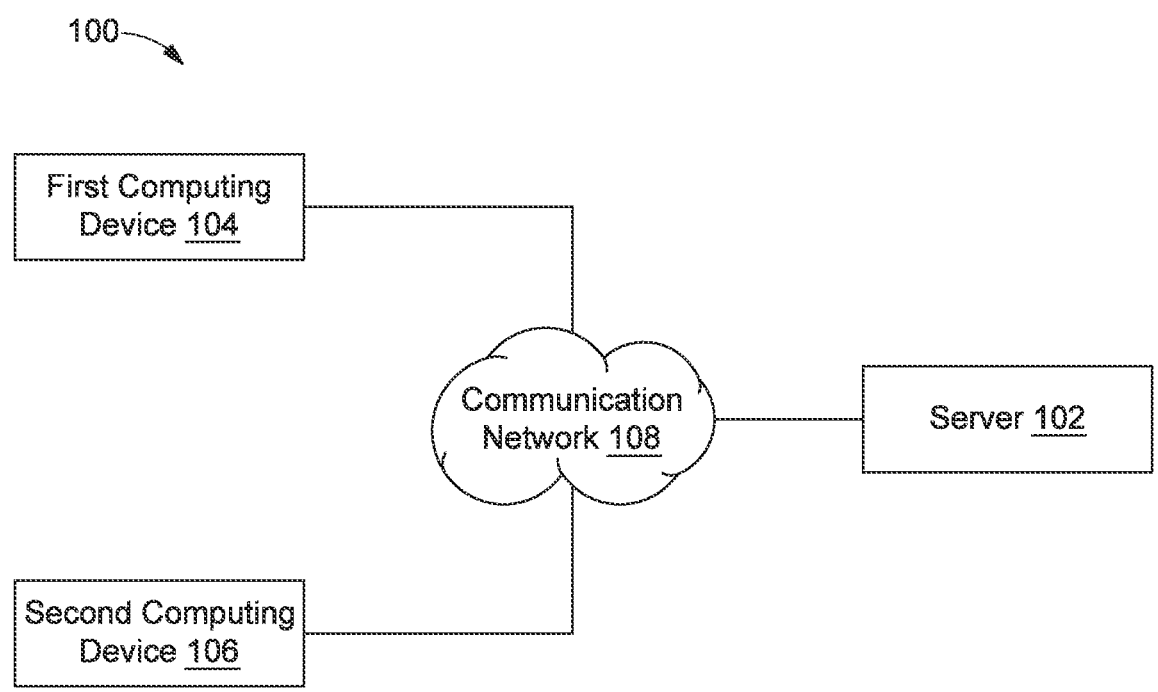
FIG. 1 illustrates a block diagram of an environment for managing anonymized data across computing devices in a blockchain network, in accordance with an exemplary embodiment of the present disclosure.

FIG. 1 is a diagram that illustrates an environment 100 for managing anonymized data across computing devices in a blockchain network, in accordance with an exemplary embodiment of the present disclosure.

The environment 100 may include a server 102, a first computing device 104, and a second computing device 106. The server 102, the first computing device 104, and the second computing device 106 are configured to communicate with each other via a communication network 108. Examples of the communication network 108 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof.

The communication network 108 may facilitate data exchange between the first computing device 104 to the second computing device 106 through the server 102. In an embodiment, the first computing device 104 may include a primary application associated with a first entity. Further, the second computing device 106 may include a secondary application associated with a second entity. It should be noted that an entity (i.e., the first entity and the second entity) may correspond to a business enterprise. Further, the primary application and the secondary application may correspond to an enterprise managed application, i.e., a digital application (e.g., web application, or mobile application, website, etc.). Examples of the enterprise managed application may include, but are not limited to, a shopping application, a food application, a travel application, an educational application, a music application, an entertainment application, a medical application, and the like.

Initially, the server 102 may receive a first request from the first computing device 104, over the communication network 108. In particular, a user of the first entity may send the first request using the first computing device 104 to the server 102. The first request may correspond to a registering request. The user may correspond to a person responsible for managing the primary application of the first entity. In some embodiment, the user of the first entity may be referred as a network administrator or a network admin. By way of an example, when the first entity is a shopping business enterprise, then the primary application associated with the first entity may be the shopping application. Upon receiving the first request, the server 102 may be configured to onboard the first entity, in order to register the first entity. In an embodiment, in order to onboard the first entity, the user may sign-up using his personal details with the server 102. Further, during sign-up, the user may be required to define an authentication credentials. Upon defining the authentication credentials, a user, i.e., a platform admin of the server 102 may onboard the user of the first entity.

Once the authentication credentials are defined and the first entity of the first computing device 104 is onboarded, then the user of the first entity may be able to access the server 102 using the authentication credentials. In an embodiment, the authentication credentials may include one of a username and a password, a digital token, and a digital certificate. As will be appreciated, the authentication credentials are not limited to one mentioned above and may include any credentials that may be used to verify identity of the user of the first entity. By way of an example, in order to access the server 102, the user of the first entity may sign-in in the server 102 using the authentication credentials.

Upon sign-in, the user of the first entity may be able to generate a blockchain network using the first computing device 104 through the server 102. The blockchain network may include a blockchain ledger. Further, the blockchain network including the blockchain ledger is generated based on a dataset associated with each of a plurality of end users. In an embodiment, an end user of the plurality of end users may be a consumer (or customer) of the first entity. In other words, the end user may be a person that may consume goods and services provided by the first entity. By way of an example, when the first entity is the shopping enterprise and the primary application associated with the first entity is the shopping application, then the end user may be the person who may purchase goods (for example: cloths) using the shopping application of the shopping enterprise.

As will be appreciated, the dataset associated with each of the plurality of end users may be associated with the first computing device 104. Further, each of the plurality of end users may be consumer of the first entity (e.g., the shopping enterprise). In addition, the dataset associated with each of the plurality of end users may collected during their purchase of goods and services from the primary application associated with the first entity. In an embodiment, the dataset associated with each of the plurality of end users may be retrieved by the first computing device 104 from a plurality of data sources. Examples of the plurality of data sources may include, but are not limited to, point of sale (POS) data source, demographic data source, web activity, social media activity, and online surveys. As will be appreciated, the dataset associated with each of the plurality of end users may be retrieved by the first entity from either one or more of the plurality of data sources. By way of an example, when each of the plurality of end users may be customer (or consumer) of the first entity (e.g., the shopping enterprise), then the dataset associated with each of the plurality of end users may collected during their purchase of goods (e.g., cloths, home furnishing products, etc.) from the primary application associated with the first entity. For example, the dataset associated with the end user may include details with respect to price range of products being purchased, types of products often purchased, etc.

Further, in order to generate the blockchain network, the user of the first entity may construct the blockchain ledger corresponding to the dataset associated with each of the plurality of end users using the first computing device 104 through the server 102. In an embodiment, the blockchain ledger may be constructed based on a set of customization settings and one or more criteria. In other words, the server 102 may enable the user of the first entity to use the set of customization settings provided by the server 102 to construct the blockchain ledger for the dataset associated with the plurality of end users. In order to construct the blockchain network, the user of the first entity may be able to structure the blockchain network based on the set of customization settings and the one or more criteria. In other words, the user of the first entity may generate the blockchain network based on his requirements using the set of customization settings provided by the server 102. In addition to the set of customization settings, the user of the first entity may be able to define the one or more criteria for generating the blockchain network that includes the blockchain ledger.

In an embodiment, the set of customization settings may include, but is not limited to, a first customization setting to configure the blockchain ledger, a second customization setting to configure bootstrapping process, a third customization setting to initiate bootstrapping process, a fourth customization setting to configure the unique ledger key based on a set of pre-set attributes, a fifth customization setting to rotate the unique ledger key, a sixth customization setting to rebuild the blockchain network, a seventh customization setting to capture subset from the dataset corresponding to one or more blockchain ledgers, an eighth customization settings to combine two or more blockchain ledgers, a ninth customization setting to retrieve one or more subset from the dataset associated with each of the plurality of end users from the blockchain ledger, and a tenth customization setting to customize application logic. The set of customization settings and the one or more criteria provided by the server 102 for generating the blockchain network is further explained in detail in conjunction with FIG. 3.

Once the blockchain ledger is generated, then the user of the first entity may generate a unique ledger key for the dataset associated with each of the plurality of end users using the first computing device 104 through the server 102. In order to generate the unique ledger key, the user of the first entity may define ledger key criteria for generating the unique ledger key through the server 102. Once the ledger key criteria are defined for generating the ledger key, the unique ledger key may be generated for the dataset associated with each of the plurality of end users through the server 102.

Further, upon generating the unique ledger key, the dataset associated with each of the plurality of end users may be stored in the blockchain ledger constructed by the first entity, based on the unique ledger key. In some embodiment, the unique key associated with each of the plurality of end users may be updated by a new ledger key generated based on the ledger key criteria defined by the user of the first entity.

Once the blockchain network including the blockchain ledger is generated by the user of the first entity, then a joining request may be communicated by the user of the first entity to the second entity of the second computing device 106 over the communication network 108. In particular, the first entity may send the joining request to the second entity to join the generated blockchain network via the server 102. It should be noted that the user of the first entity may send the joining request to more than one second entity based on his requirement. For example, in some embodiment, the user of the first entity corresponding to the primary application may send the joining request to join the generated blockchain network, upon determining number of overlapping customers between the first entity and the one or more second entities. As will be appreciated, the first entity may send the joining request to one or more second entities to enable exchange of the dataset associated with the plurality of end users.

Upon communicating the joining request to the second entity of the second computing device 102, a user of the second entity may accept or reject the joining request based on his requirement. In an embodiment, once the user of the second entity accepts the joining request, then access to the dataset associated with each of the plurality of end users may be granted to the second entity of the second computing device 106. In other words, when the user of the second entity accepts the blockchain network joining request received form the first entity, then the second entity may be able to access the dataset associated with each of the plurality of end users through the server 102. A method of granting access to the dataset associated with each of the plurality of end users by the second entity is further explained in detail in conjunction with FIG. 5.

It should be noted that, the user of the first entity may generate one or more blockchain networks based on his requirement using above mentioned technique. Further, the joining request corresponding to the one or more blockchain network may be sent by the first entity of the first computing device 104 to the one or more second entities of one or more second computing devices (same as the second computing device 106) based on his requirement.

Figure 2:
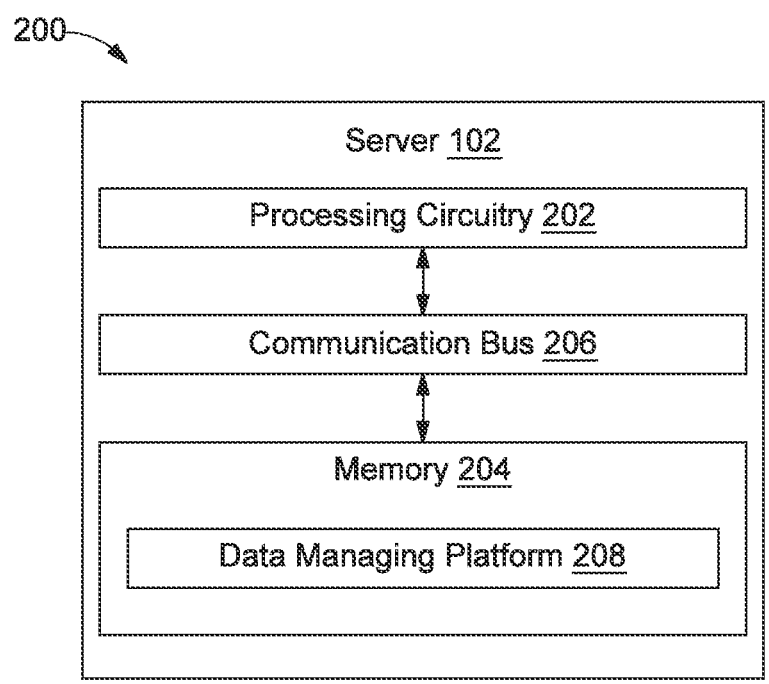
FIG. 2 illustrates a block diagram of a system for managing anonymized data across computing devices in a blockchain network, in accordance with an exemplary embodiment of the present disclosure.

FIG. 2 is a diagram that illustrates a system 200 for managing anonymized data across computing devices in a blockchain network, in accordance with an exemplary embodiment of the present disclosure. FIG. 2 is explained in conjunction with elements from FIG. 1.

The server 102 may include a processing circuitry 202 and a memory 204 communicatively coupled to the processing circuitry 202 via a communication bus 206. The memory 202 may store processor instructions. The processor instructions, when executed by the processing circuitry 202, may cause the processing circuitry 202 to implement one or more embodiments of the present disclosure such as, but not limited to, generating the blockchain network, communicating the joining request to the second computing device for joining the blockchain network, and granting access to the second computing device 102. The memory 204 may include a data managing platform 208.

The data managing platform 208 may enable management of anonymized data (i.e., the dataset associated with the plurality of end users) across computing devices in the blockchain network through the processing circuitry 202. The computing devices may correspond to the first computing device 104 and the second computing device 106. In an embodiment, the first computing device 104 may include the primary application associated with the first entity. Further, the second computing device 106 may include the secondary application associated with the second entity. It should be noted that an entity (i.e., the first entity and the second entity) may correspond to a business enterprise. Further, the primary application and the secondary application may correspond to an enterprise managed application, i.e., the digital application, e.g., web application, or mobile application, website, etc. Examples of the enterprise managed application may include, but are not limited to, a shopping application, a food application, a travel application, an educational application, a music application, an entertainment application, a medical application, and the like.

Initially, the data managing platform 208 may receive a first request from the first computing device 104. In an embodiment, the first request received from the first computing device 104 may correspond to a registering request. In particular, a user of the first entity may send the first request using the first computing device 104 to the data managing platform 208. The user of the first entity may correspond to a person responsible for managing the primary application of the first entity via the first computing device 104. In an embodiment, the user of the first entity may be the network administrator or the network admin of the blockchain network.

Upon receiving the first request, the data managing platform 208 may be configured to onboard the first entity of the first computing device 104. In other words, in order to use the data managing platform 208, initially, the user of the first entity may sign-up with the data managing platform 208 by providing his personal details during registering process. Examples of personal details may include, but are not limited to, 'entity name', 'username', 'date of birth', 'email', and the like. Further, during the registering process, the data managing platform 208 may request the user of the first entity to define an authentication credentials. Once the user of the first entity completes the registration process and the authentication credentials are defined, then the user of the first entity may be onboarded by the platform admin of the data managing platform 208. Once the user of the first entity is onboarded by the platform admin, then the user of the first entity may be able to access the data managing platform 208 based on the authentication credentials. In an embodiment, the authentication credentials may include one of a username and a password, a digital token, and a digital certificate. By way of an example, the user of the first entity may access the data managing platform 208 by signing-in in the data managing platform using the authentication credentials.

The user of the first entity may access the data managing platform 208 to generate a blockchain network. In an embodiment, the blockchain network may be generated to exchange the dataset associated with the plurality of end users. In an embodiment, an end user of the plurality of end users may be a customer (or consumer) of the first entity. In an embodiment, each of the plurality of end users may be associated with the primary application of the first entity. In particular, the end user may be a person that may consume goods and services provided by the first entity. By way of an example, when the first entity is the food enterprise and the primary application associated with the first entity is the food application, then the end user may be the person who may purchase food or beverages using the food application of the food enterprise.

Further, the dataset associated with each of the plurality of end users may collected during their purchase of goods and services from the primary application associated with the first entity. In an embodiment, the dataset associated with each of the plurality of end users may be retrieved by the first entity from the plurality of data sources. Examples of the plurality of data sources may include, but are not limited to, point of sale (POS) data source, demographic data source, web activity, social media activity, and online surveys. As will be appreciated, the dataset associated with each of the plurality of end users may be retrieved by the first entity from either one or more of the plurality of data sources. For example, the dataset associated with an end user may include details with respect to frequently ordered 'food item', 'type of food', 'type of beverages', etc.

Once the user of the first entity signs-in with the data managing platform 208 using the authentication credentials, then the user of the first entity may generate the blockchain network. It should be noted that, for ease of explanation, generation of one blockchain network by the user of one entity (i.e., the first entity) is explained in conjunction with present FIG. 1. However, based on user requirement, the user of the first entity may generate one or more blockchain networks using the data managing platform 208 to exchange the dataset associated with the plurality of end users.

To generate the blockchain network, initially, the user of the first entity may construct the blockchain ledger using the data managing platform 208. In an embodiment, the blockchain ledger may be constructed corresponding to the dataset associated with each of the plurality of end users. Further, the blockchain ledger may be constructed based on the set of customization settings and the one or more criteria. In other words, the user of the first entity may be able to access the set of customization settings provided by the data managing platform 208 to construct the blockchain ledger. In other words, the user of the first entity may utilize the set of customization settings provided by the data managing platform 208 to construct the blockchain ledger. Further, the user of the first entity may be able to define the one or more criteria for constructing the blockchain ledger. In an embodiment, the set of customization settings may include, but is not limited to, a first customization setting to configure the blockchain ledger, a second customization setting to configure bootstrapping process, a third customization setting to initiate bootstrapping process, a fourth customization setting to configure the unique ledger key based on a set of pre-set attributes, a fifth customization setting to rotate the unique ledger key, a sixth customization setting to rebuild the blockchain network, a seventh customization setting to capture subset from the dataset corresponding to one or more blockchain ledgers, an eighth customization settings to combine two or more blockchain ledgers, a ninth customization setting to retrieve one or more subset from the dataset associated with each of the plurality of end users from the blockchain ledger, and a tenth customization setting to customize application logic. Further, the one or more criteria defined by the first entity may be a pre-defined data structure for the blockchain ledger, a pre-defined database configurations associated with the dataset of each of the plurality of end users, the ledger key criteria, and the like. Each of the set of customization settings provided by the data managing platform 208 for constructing the blockchain ledger is further depicted and explained in greater detail in conjunction with FIG. 3.

Once the blockchain ledger is constructed using the set of customization settings and the one or more criteria, then the user of the first entity may generate the unique ledger key corresponding to the dataset associated with each of the plurality of end users using the data managing platform 208. Further, upon generating the unique ledger key for the dataset of each of the plurality of end users, the dataset of each of the plurality of end users may be stored with the blockchain ledger using a corresponding unique ledger key generated for the dataset. In particular, the blockchain ledger may store the dataset associated with the plurality of end users based on the corresponding unique leger key. In an embodiment, the blockchain ledger may correspond to a digital database. The digital database may be distributed among the computing devices (such as the first computing device 104 and the second computing device 106) that are part of the blockchain network generated by the user of the first entity. In other words, each computing device that joins the blockchain network created by the user of the first entity may be able to access the dataset associated with each of the plurality of end users using the corresponding unique ledger key.

Once the blockchain leger is constructed and the dataset is stored in the blockchain ledger using the corresponding unique ledger key, then the user of the first entity may communicate the joining request to the second entity of the second computing device 106. It should be noted that, for ease of explanation, the communication of the joining request to one second entity is explained in present FIG. However, the user of the first entity may request any number of second entities to join the generated blockchain network using the data managing platform 208. Upon sending the joining request to the second entity, the user of the second entity may accept or reject the joining request received from the first entity via the data managing platform 208 based on his requirement. In an embodiment, once the user of the second entity accepts the joining request, then access to the dataset associated with each of the plurality of end users may be granted to the second entity via the second computing device 106.

In particular, once the user of the second entity accepts the joining request, then the second entity may be able to access the dataset associated with the end user of the plurality of end users stored within the blockchain ledger by retrieving the corresponding unique ledger key. In an embodiment, the unique ledger key of the dataset associated with each of the plurality of end users may get updated with the new ledger key based on the ledger key criteria defined by the user of the first entity while constructing the blockchain ledger. The second entity may access the dataset associated with each of the plurality of end users to notify the plurality of end users about one or more products or services offered by the second entity and offers with the respect to one or more products or services. This may enable intelligent exchange of data among genuine entities without compromising data present within the dataset of the plurality of end users, with fraud entities. A method of enabling access of the dataset associated with the plurality of end users to one or more second entity is depicted and further explained in detail in conjunction with FIG. 4. Further, the data managing platform 208 used for constructing the blockchain network for managing intelligent exchange of data among entities is further depicted and explained in greater detail in conjunction with FIG. 3.

It should be noted that the aforementioned data managing platform 208 may be represented as a single module or a combination of different modules. Further, as will be appreciated by those skilled in the art, the data managing platform 208 may reside, in whole or in parts, on one device or multiple devices in communication with each other. In some embodiments, the data managing platform 208 may be implemented as dedicated hardware circuit comprising custom application-specific integrated circuit (ASIC) or gate arrays, off-the-shelf semiconductors such as logic chips, transistors, or other discrete components. The data managing platform 208 may also be implemented in a programmable hardware device such as a field programmable gate array (FPGA), programmable array logic, programmable logic device, and so forth. Alternatively, the data managing platform 208 may be implemented in software for execution by various types of processors (e.g., the processing circuitry 202). An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for managing anonymized data across computing devices in the blockchain network. For example, the exemplary server 102 may exchange the dataset associated with the plurality of end users by the processes discussed herein. In particular, as will be appreciated by those of ordinary skill in the art, control logic and/or automated routines for performing the techniques and steps described herein may be implemented by the server 102 either by hardware, software, or combinations of hardware and software. For example, suitable code may be accessed and executed by the one or more processors on the server 102 to perform some or all of the techniques described herein. Similarly, application specific integrated circuits (ASICs) configured to perform some, or all of the processes described herein may be included in the one or more processors on the server 102.

Figure 3:
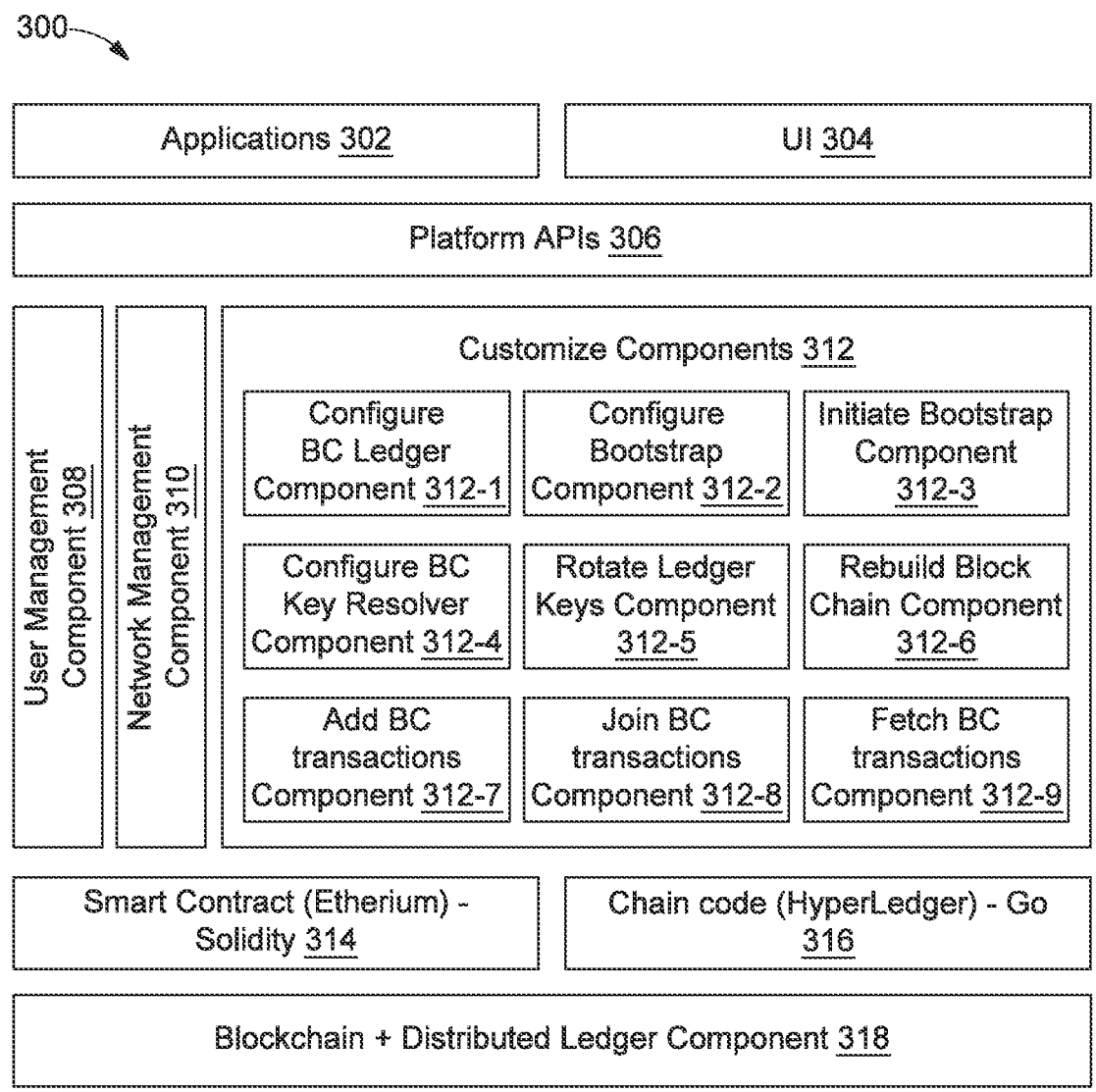
FIG. 3 illustrates a data managing platform configured for enabling intelligent exchange of anonymized data by customizing a blockchain network, in accordance with an exemplary embodiment of the present disclosure.

FIG. 3 is a diagram that illustrates a data managing platform 300 configured for enabling intelligent exchange of anonymized data by customizing a blockchain network, in accordance with an exemplary embodiment of the present disclosure. FIG. 3 is explained in conjunction with elements from FIGS. 1 and 2.

The data managing platform 300 (same as the data managing platform 208) may be hosted on the server 102. Further, the data managing server 300 may enable the user of the first entity to utilize the data managing platform 300 for generating the blockchain network. The first entity may include the primary application. Further, the user of the first entity may access the data managing platform 300 via the first computing device 104. In an embodiment, the user of the first entity may access the data managing platform 300 upon onboarding, using the authentication credentials.

In other words, once the user of the first entity completes the registration process with the data managing platform 300, then upon registering the user of the first entity may be able to access the data managing platform 300. In an embodiment, any entity (i.e., the business enterprises) may be able to generate one or more associated blockchain networks to enable intelligent exchange of data (present within the dataset) associated with their customers (i.e., end users) with other entities by requesting the other entities to join the one or more associated blockchain network. As will be appreciated, the first entity may be onboarded by the platform administrator (also referred as the platform admin) of the data managing platform 300 to enable the first entity to use the data managing platform 300 for generating the blockchain network. Further, once the first entity is onboarded, the user (i.e., the network admin) of the first entity may generate the blockchain network using the data managing platform 300.

Once the first entity is onboarded, the user of the first entity may be able to access the data managing platform 300 based on the authentication credentials provided to the user, during the onboarding. As depicted via the present FIG. 3, the data managing platform 300 may include applications 302. The applications 302 may enable the user of the first entity to perform one or more tasks to generate the blockchain network. In particular, the data managing platform 300 may be a foundation on which the applications 302 may run. Further, the data managing platform 300 may provide a User Interface (UI) 304 that may enable the user of the first entity to interact with the data managing platform 300 to generate the blockchain network. In particular, the UI 304 may enable the user to generate the blockchain network by constructing the blockchain ledger for the dataset associated with the plurality of end users based on the set of customization settings and the one or more criteria.

Further, the data managing platform 300 may include a set of platform Application Programming Interfaces (APIs) 306 that is built as part of the data managing platform 300. The data managing platform 300 may include a user management component 308. The user management component 308 may enable the user of the first entity to manage his user account. By way of an example, the user of the first entity may change his authentication credentials, such as 'the username' and 'password' used for logging-in the data managing platform 300, using the user management component 308. The data managing platform 300 may further include a network management component 310. The network management component 310 may enable the user of the first entity to manage the generated blockchain network. In addition, the network management component 310 may enable the user of the first entity to manage the blockchain network that includes one or more blockchain networks.

Further, the data managing platform 300 may include a set of customization components 312. The set of customization components 312 may enable the network admin to generate the blockchain network by constructing the blockchain ledger. The blockchain ledger may be constructed by customizing one or more of the set of customization settings using the set of customization components 312 to construct the blockchain ledger based on his requirements. Further, in order to construct the blockchain ledger, the user of the first entity may be able to define the one or more criteria required for constructing the blockchain network.

In an embodiment, the set of customization settings may include a first customization setting to configure the blockchain ledger, a second customization setting to configure bootstrapping process, a third customization setting to initiate bootstrapping process, a fourth customization setting to configure the unique ledger key based on a set of pre-set attributes, a fifth customization setting to rotate the unique ledger key, a sixth customization setting to rebuild the blockchain network, a seventh customization setting to capture subset from the dataset corresponding to one or more blockchain ledgers, an eighth customization settings to combine two or more blockchain ledgers, a ninth customization setting to retrieve one or more subset from the dataset associated with each of the plurality of end users from the blockchain ledger, and a tenth customization setting to customize application logic.

Further, as depicted via the data managing platform 300, the set of customization components 312 used for defining the set of customization settings may include a configure blockchain (BC) Ledger component 312-1, a configure bootstrap component 312-2, an initiate bootstrap component 312-3, a configure blockchain (BC) key resolver component 312-4, a rotate ledger keys component 312-5, a rebuild blockchain component 312-6, an add blockchain (BC) transactions component 312-7, a join blockchain (BC) transactions component 312-8, and a fetch blockchain (BC) transactions component 312-9.

The configure BC ledger component 312-1 may enable the network admin (i.e., the user of the first entity) to construct the blockchain ledger (i.e., a custom blockchain ledger) based on a user-defined data structure. In an embodiment, the configure BC ledger component 312-1 may provide the first customization setting to configure the blockchain ledger. In other words, the configure BC ledger component 312-1 may enable the network admin to construct the blockchain ledger based on the data structure defined by him. In an embodiment, the user-defined data structure may correspond to a criterion of the one or more criteria defined by the network admin for constructing the blockchain ledger. In particular, the network admin may design a ledger schema to define the data structure of the blockchain ledger using the configure BC ledger component 312-1.

The configure bootstrap component 312-2 may enable the network admin to associate the blockchain ledger with a user-defined database (e.g., relational database management system (RDBMS), or structured query language (SQL)). In other words, the configure bootstrap component 312-2 may enable the network admin to perform bootstrapping process. In particular, the configure bootstrap component 312-2 may enable the network admin to link the blockchain ledger with the dataset associated with the plurality of end users that are stored in the user-defined database. By way of an example, in order to link the blockchain ledger with the dataset, the dataset associated with the plurality of end users that is stored in a pre-defined format in the user-defined database may be converted based on the data structure defined for the blockchain ledger. In an embodiment, each of the plurality of end users may be associated with the first entity. In other words, each of the plurality of end users may be customers of the first entity. Further, the dataset of each of the plurality of end users may correspond to data gathered based on purchases (of goods and services) done by each of the plurality of end users using the primary application associated with first entity. As will be appreciated, the goods and the services may be associated with the first entity.

The initiate bootstrap component 312-3 may enable the network admin to initiate bootstrapping process. In other words, the initiate bootstrap component 312-3 may be configured to enable the user of first entity to initiate bootstrapping process. In an embodiment, by clicking of the initiate bootstrap component 312-3, the network admin may be able to start the bootstrapping process for the blockchain ledger from the user-defined database. In particular, by clicking on the initiate bootstrap component 312-3, the dataset associated with each of the plurality of end users may start moving from the user-defined database to the blockchain ledger.

Further, the configure blockchain (BC) key resolver component 312-4 may be used to configure the unique ledger key based on a set of pre-set attributes (i.e., ledger key attributes) and the ledger key criteria (i.e., duplication rules) defined by the network admin. In an embodiment, the unique ledger key may be generated corresponding to the dataset associated with each of the plurality of end users to anonymize the dataset associated with each of the plurality of end users using the unique ledger key. In other words, the configure BC key resolver component 312-4 may enable the network admin to generate the unique ledger key based on configurations (i.e., the set of pre-set attributes and the ledger key criteria) defined by the network admin. In particular, the network admin may be able to define the configurations for generating the unique ledger key using the configure BC key resolver component 312-4. In an embodiment, the ledger key attributes may be used to customize the unique ledger key. Further, example of the ledger key criteria defined by the network admin using the configure BC key resolver component 312-4 to generate the unique ledger key may be 'generate the new ledger key based on an update in the dataset associated with each of the plurality of end users', or 'generate the new ledger key for the unique ledger key after every 24 hours', and the like. Further, the configure BC key resolver component 312-4 may enable the network admin to create the unique ledger key corresponding to the dataset of the plurality of end users by invoking an external program.

The rotate ledger keys component 312-5 may be configured to provide access to the fifth customization setting, i.e., to rotate the unique ledger key generated for the dataset of each of the plurality of end users in the blockchain network. In other words, the rotate ledger keys component 312-5 may generate the new ledger key corresponding to the dataset associated with each of the plurality of end users based on the ledger key criteria defined for the unique ledger key while generating the unique ledger key. By way of an example, when the ledger key criteria defined for generating the new ledger key was to 'generate the new ledger key based on the update in the dataset associated with each of the plurality of end users'. Then, in this case, when the rotate ledger keys component 312-5 may notice an update in the dataset of an end user, then the rotate ledger keys component 312-5 may generate the new ledger key for an updated dataset of the end user. In some embodiment, the unique ledger key may be generated on demand of the network admin. In other words, the unique ledger key corresponding to the dataset associated with each of the plurality of end users may be generated based on an input received corresponding to the demand (or ledger key generation requirement) of the network admin. Further, the rotate ledger keys component 312-5 may update the unique ledger key previously generated for the dataset of the end user with the new ledger key generated corresponding to the updated dataset of the end user, or the input received from the network admin corresponding to the ledger key criteria. In an embodiment, the rotate ledger keys component 312-5 may update the unique ledger key generated for the dataset of each of the plurality of end users with the new ledger key to ensure data privacy and security compliance.

The rebuild blockchain component 312-6 may be configured to provide access to the sixth customization setting to rebuild the blockchain network. In other words, the network admin may be able to rebuild the blockchain network using the rebuilt blockchain component 312-6 based on his requirement. In other words, the network admin may have ownership of the blockchain network and with the help of the rebuild blockchain component 312-6, the network admin may be able to rebuild the blockchain network from scratch upon determining any compromise with the blockchain network. In other words, if the network admin may notice that any second entity having access to the blockchain ledger that is not part of the blockchain network, then in this case the network admin will be able to rebuild the blockchain based on his requirements from the start using the rebuild blockchain component 312-6.

The add blockchain (BC) transactions component 312-7 may be configured to provide access to the seventh customization setting to capture subset from the dataset of the plurality of end users stored in one or more blockchain ledgers. In particular, the add BC transactions component 312-7 may be configured to capture transactions (i.e., the subset from the dataset) corresponding to one or more blockchain networks through a single interface. In some embodiment, in order to capture transactions, the add BC transactions component 312-7 may employ an Artificial learning (AI) or a Machine Learning (ML) technique to identify a correct blockchain network to retrieve the subset from the dataset stored in the blockchain ledger of the correct blockchain network. In addition, the add BC transactions component 312-7 may enable the network admin to add transactions (i.e., the subset) to the blockchain ledger of the blockchain network that was either self-created, or add transactions to the blockchain ledger of the blockchain network that it is an approved participant of (i.e., the second entity that may have joined the generated blockchain network).

The join blockchain (BC) transactions component 312-8 may be configured to provide access to the eighth customization setting to combine two or more blockchain ledgers associated with different blockchain networks. In particular, the join BC transactions component 312-8 may enable the network admin to combine the two blockchain ledgers of the two different blockchain networks. In an embodiment, the network admin may combine the two blockchain ledgers based on the unique ledger key associated with the dataset of each of the plurality of end users stored in a corresponding blockchain ledger of the two blockchain ledger. By way of an example, when the dataset stored for the plurality of end users in a first blockchain ledger is determined to be same as the dataset stored for the plurality of end users in a second blockchain ledge based on comparison of the unique ledger key, then in this case, the network admin may be able to combine the first blockchain ledger with the second blockchain ledger.

The fetch blockchain (BC) transactions component 312-9 may be configured to provide access to the ninth customization setting to retrieve one or more subsets from the dataset associated with each of the plurality of end users, from the blockchain ledger. In other words, the network admin may be able to retrieve the transactions from the one or more blockchain ledgers of the associated blockchain network using the fetch BC transactions component 312-9. The network admin may retrieve the transactions from the one or more blockchain legers of the associated blockchain network that were created by the network admin himself, or from the one or more blockchain ledger of the associated blockchain network that the first entity is the approved participant of.

In addition, the data managing platform 300 may further include a smart contract (Etherium)-Solidity component 314. The smart contract (Etherium)-Solidity component 314 may enable the network admin to customize application logic (i.e., the tenth customization setting). In should be noted that, the smart contracts may be defined as programs that exist on a blockchain (i.e., the Etherium blockchain).

The data managing platform 300 may further include a chain code component 316. The chain code component 316 may be used to write the application logic. In some embodiment, the application logic may be written in a 'go' programming language. Further, the data managing platform 300 may be a Hyperledger fabric platform. The data managing platform 300 may further include a blockchain networks and blockchain ledgers managing component 318. The blockchain ledgers managing component 318 may be used to write the application logic. The blockchain networks and blockchain ledgers managing component 318 may be used by network admins to manage one or more blockchain ledgers and one or more blockchain networks. In addition, by using the blockchain networks and blockchain ledgers managing component 318, the network admins may be able to manage a collection of blockchain networks that includes the one or more blockchain ledger.

Figure 4:
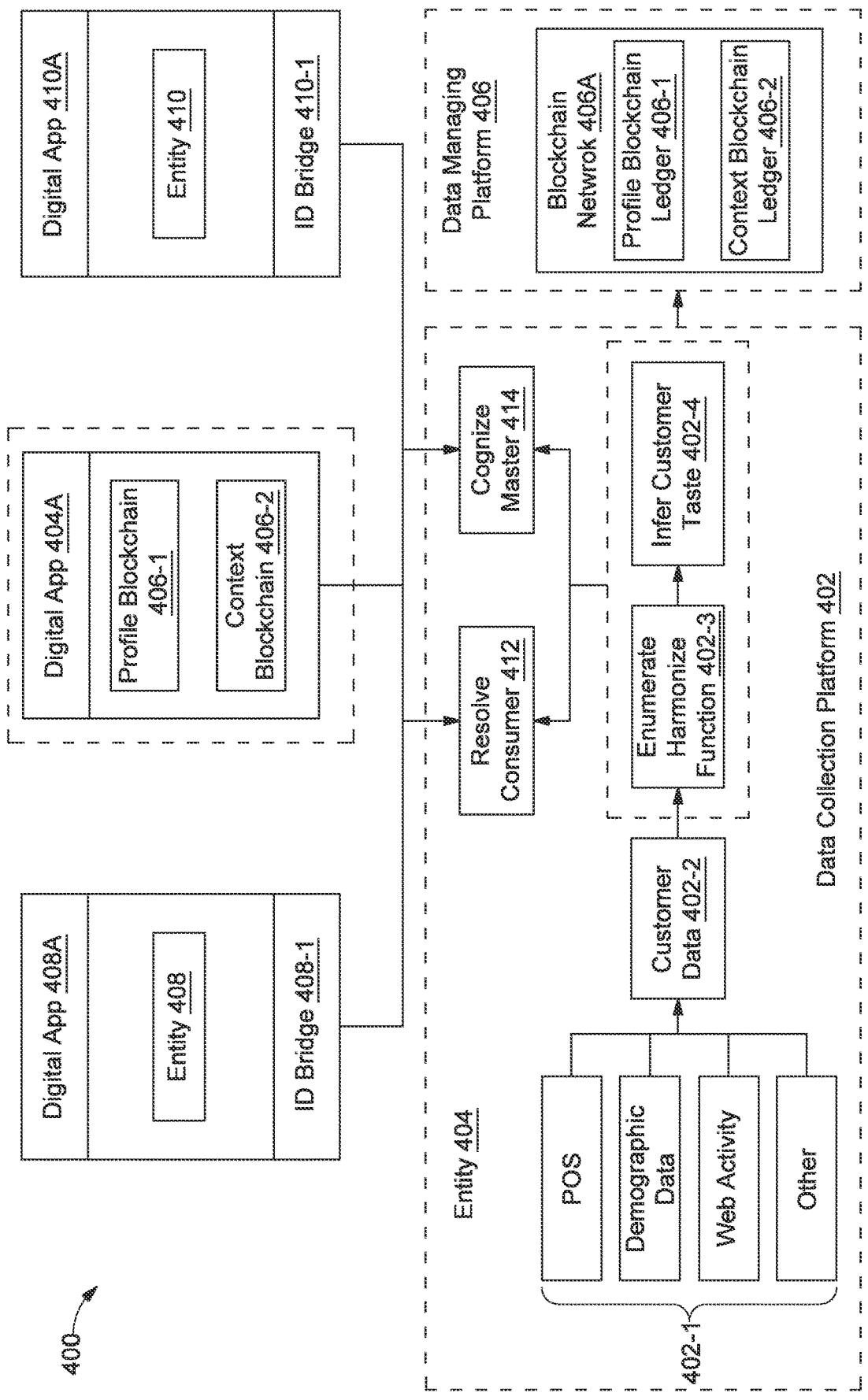
FIG. 4 illustrates an exemplary control logic depicting intelligent exchange of anonymized data across computing devices in a blockchain network, in accordance with an exemplary embodiment of the present disclosure.

FIG. 4 is a diagram that illustrates an exemplary control logic 400 depicting intelligent exchange of anonymized data across computing devices in a blockchain network, in accordance with an exemplary embodiment of the present disclosure. FIG. 4 is explained in conjunction with elements from FIGS. 1, 2, and 3.

A data collection platform 402 of an entity 404 (e.g., a business enterprise) is depicted via present FIG. 4. As will be appreciated, the data managing platform 402 may be an enterprise managed platform that is used for collecting data from a digital application 404A (i.e., the enterprise managed platform) of the entity 404. The entity 404 may correspond to the first entity associated with the first computing device 104. Initially, the entity 404 may collect customer data 402-2 (i.e., the dataset) associated with the plurality of end users from a plurality of data sources 402-1 using the data collection platform 402. As depicted via the plurality of data sources 402-1, may include a point of sales (POS) data source, a demographic data source, a web activity data source, and other, such as, social media activity, online surveys, and the like. It should be noted that each of the plurality of end users may correspond to a customer of the entity 404.

Once the customer data 402-2 is collected via the data collection platform 402, a user (i.e., a person responsible for managing digital applications of the business enterprise) of the entity 404 may use an Enumerate Harmonize function 402-3 to categories the plurality of end users based on their preference of goods and services using the customer's data 402-2. The user of the first entity may correspond to the network admin. Further, upon categorizing each of the plurality of end users, the network admin of the entity 404 may determine taste (i.e., the preferences) of each of the plurality of end users using an infer customer taste 402-4 via the data collection platform 402.

Once the taste of each of the plurality of end users is determined and the dataset for each of the plurality of end users is generated, then the network admin may log-in a data managing platform 406 (same as the data managing platform 300) to generate the blockchain network. In an embodiment, the user may login using the authentication credential provided by the platform admin at the time of onboarding the entity 404. Upon login, the network admin may generate a blockchain network 406A using the data managing platform 406. The blockchain network may include two blockchain ledgers, i.e., a profile blockchain ledger 406-1 and a context blockchain ledger 406-2. In an embodiment, the profile blockchain ledger 406-1 may include personal information, such as, 'name', 'age', 'location', 'email' and the like, related to each of the plurality of end users. Further, the context blockchain ledger 406-2 may include purchasing behavior of each of the plurality of end users, likelihood towards certain product, etc.

Once the profile blockchain ledger 406-1 and the context blockchain ledger 406-2 is generated by the network admin, then the network admin may communicate the joining request to one or more second entities. Each of the one or more second entities may include an associated secondary application. As depicted via the present FIG. 4, two second entities, i.e., an entity 408 and an entity 410 including a digital application 408A and a digital application 410A, respectively, are depicted via the present FIG. 4. Now consider a scenario, where the entity 408 and the entity 410 may have joined the blockchain network 406A created by the network admin of the entity 404 by accepting the communicated joining request.

Once the entity 408 and the entity 410 joins the blockchain network 406A, then the entity 408 and the entity 410 may be able to access the dataset associated each of the plurality of end users that are stored in the profile blockchain ledger 406-1 and the context blockchain ledger 406-2. In order to access the dataset associated with an end user from the plurality of end users, whenever the end user may login to the second application (i.e., the digital application 408A or 410A) of the entity 408 or the entity 410 using personal attributes (i.e., a set of attributes), such as, 'name', 'email', etc., then using the personal attributes, the entity 408 or the entity 410 may access the dataset associated with the end user from the profile blockchain ledger 406-1 and the context blockchain ledger 406-2. To access the dataset of the end user, an Identity (ID) Bridge 408-1 or an ID bridge 410-1 of the entity 408 or the entity 410, respectively, may invoke in real time to retrieve the dataset associated with the end user. In order to retrieve the dataset associated with the end user, the personal attributes received during login may be shared by the entity 408 or the entity 410 with the data managing platform 406. Further, upon sharing the personal attributes associated with the end user, the entity 408 or entity 410 may be able to retrieve the unique ledger key associated with the dataset of the end user via the ID bridge 408-1 and the ID bridge 410-1 through a resolve consumer 412. In other words, the ID bridge 408-1 or the ID bridge 410-1 associated with the entity 408 or the entity 410, respectively, may invoke the resolve consumer 412 to retrieve the unique ledger key associated with the dataset of the end user. Upon retrieving the unique ledger key, the entity 408 or the entity 410 may be able to retrieve the dataset associated with the end user from the profile blockchain ledger 406-1 or the context blockchain ledger 406-2.

Further, upon retrieving the dataset of the end user, the entity 408 and the entity 410 may be able to use the dataset of the end user for their business opportunities. By way of an example, upon retrieving the dataset of the end user, the entity 408 or the entity 410 may access the dataset of the end user to show an advertisement, such as, discount of 'Rs 500' on their first purchase using the digital application 408A or 410A of the entity 408 or the entity 410. As will be appreciated, upon accessing the dataset of the end user, the entity 408 or the entity 410 may be able to know interest of the end user with respect to their purchase, based on which the entity 408 or the entity 410 may be able to provide relevant advertisement to the end user and in turn increase their business.

It should be noted that, the unique ledger key associated with the dataset of the end user may keep on updating based on the ledger key criteria defined by the network admin associated with the entity 404 while generating the blockchain network using the data managing platform 406. Further, based on updating the unique ledger key with the new ledger key for the dataset of the end user, each time the entity 408 or the entity 410 may want access to the dataset of the end user, the entity 408 and the entity 410 may require the new ledger key. The new ledger key corresponding to the dataset of the end user may be obtained based on above mentioned technique, i.e., by using the personal attributes. This is done to maintain secure access to the dataset of the end user and to ensure that any data gathered with respect to the end user is not misused or compromised.

Further, in some embodiment, the digital application 408A and the digital application 410A of the entity 408 and the entity 410 respectively may invoke a cognize master 414 to retrieve additional information with respect to the end user. Further, the cognize master 414 may be a placeholder that may temporarily store additional information of the end user. As will be appreciated, the cognize master 414 may be additional components and may not be mandatorily required, as access to the dataset of the end user may be done using the data managing platform 406.

Figure 5:
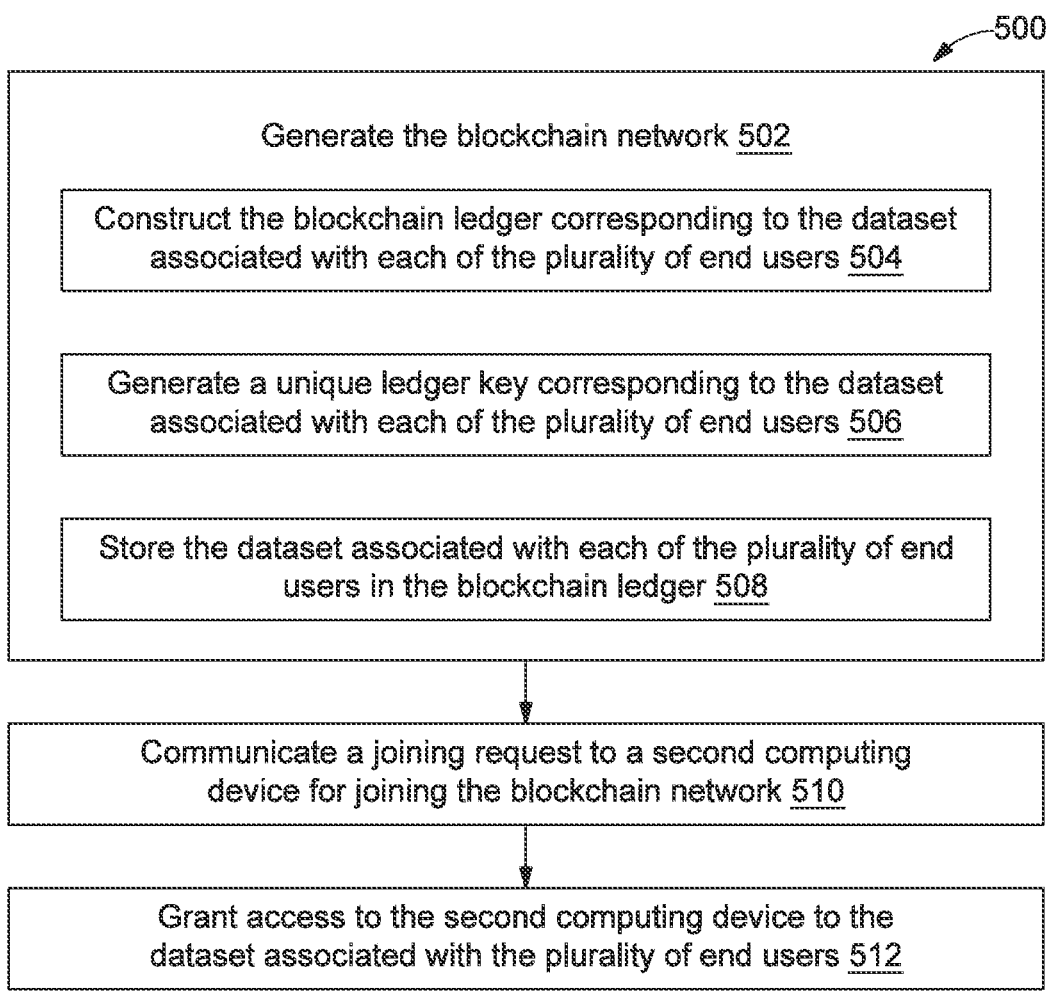
FIG. 5 illustrates a flow diagram of an exemplary process for managing anonymized data across computing devices in a blockchain network, in accordance with an exemplary embodiment of the present disclosure.

FIG. 5 is a diagram that illustrates an exemplary process 500 for managing anonymized data across computing devices in a blockchain network, in accordance with an exemplary embodiment of the present disclosure. FIG. 5 is explained in conjunction with elements from FIGS. 1, 2, 3, and 4. In an embodiment, the process 500 may be implemented by the server 102.

In order to manage anonymized data across computing devices (e.g., the first computing device 104 and the second computing device 106), initially, at step 502, the blockchain network including a blockchain ledger may be generated. The blockchain network may be created based on a dataset associated with each of a plurality of end users. It should be noted that, the dataset associated with each of the plurality of end users may correspond to the anonymized data. In an embodiment, the blockchain network may be generated by the first computing device 104 via the server 102. In particular, the blockchain network may be generated by the first computing device 104 using the data managing platform. As will be appreciated, the first computing device 104 may correspond to an electronic device used by an entity (for example: the first entity). Examples of the electronic device may include but are not limited to, a laptop, a desktop, a smartphone, and the like. As will be appreciated, the data managing platform 208 may be integrated with the server 102 and is configured to manage the anonymized data. Further, the first computing device 104 may retrieve the dataset associated with each of the plurality of end users from a plurality of data sources. Examples of the plurality of data sources may include, at least one of point of sale (POS) data source, demographic data source, web activity, social media activity, and online surveys.

Further, the dataset associated with each of the plurality of end users is associated with the first computing device 104. In other words, the plurality of end users may be end-users (or customers) of the first entity. For example, an end user of the first entity may be a person using goods and service of the entity 404, in his daily life. In order to generate the blockchain network, at step 504, the blockchain ledger corresponding to the dataset associated with each of the plurality of end users may be constructed by the first computing device 104. In an embodiment, the blockchain ledger for the dataset associated with each of the plurality of end users may be generated based on a set of customization settings and one or more criteria. The one or more criteria may be defined by the user of the first computing device 102. In an embodiment, the generation of the blockchain ledger may require structuring of the blockchain ledger based on the set of customization settings and the one or more criteria.

In an embodiment, the set of customization settings may include a first customization setting to configure the blockchain ledger, a second customization setting to configure bootstrapping process, a third customization setting to initiate bootstrapping process, a fourth customization setting to configure the unique ledger key based on a set of pre-set attributes, a fifth customization setting to rotate the unique ledger key, a sixth customization setting to rebuild the blockchain network, a seventh customization setting to capture subset from the dataset corresponding to one or more blockchain ledgers, an eighth customization settings to combine two or more blockchain ledgers, a ninth customization setting to retrieve one or more subset from the dataset associated with each of the plurality of end users from the blockchain ledger, and a tenth customization setting to customize application logic.

Further, the one or more criteria defined by the first computing device 104 may be a pre-defined data structure, a pre-defined database configurations, ledger key criteria, and the like. By way of an example, when the first computing device 104 corresponds to the electronic device of the enterprise, then a user (i.e., the network admin) of that electronic device may defined the one or more criteria for generating the blockchain ledger via the server 102. In an embodiment, the blockchain ledger may be a distributed ledger (or a digital ledger) that is configured to store the dataset associated with the plurality of end users and all transactions data that happens in the blockchain network. In other words, the blockchain ledger keeps a record of all data sharing that happens within the blockchain network.

Once the blockchain ledger is generated, then, at step 506, a unique ledger key corresponding to the dataset associated with each of the plurality of end users may be generated. In an embodiment, the unique ledger key may be generated based on ledger key criteria defined by the first computing device 102 via the server 104. Further, the unique ledger key generated for the dataset of an end user from the plurality of end users may be required for accessing the dataset associated with the end user in the blockchain network.

Further, at step 508, the dataset associated with each of the plurality of end users may be stored in the blockchain ledger, based on the unique ledger key. Once the blockchain network is generated based on the dataset of the plurality of end-users, then at step 510, a joining request may be communicated by the first computing device 104 to a second computing device (same as the second computing device 106) for joining the blockchain network. By way of an example, the first entity may send the joining request via the electronic device to an electronic device (i.e., the second computing device 106) of other entities (e.g., the second entity of the second computing device 106) for joining the generated blockchain network.

Further, based on the communicated joining request, at step 512, access may be granted to the second computing device 106. In other words, once the second computing device 106 (i.e., the second entity) accepts the joining request received from the first computing device 102 (i.e., the first entity), then the second computing device 106 may be able to access the dataset associated with the plurality of end users. A method of granting the access of the dataset associated with an end user from the plurality of end users is further explained in detail in conjunction with FIG. 6.

Figure 6:
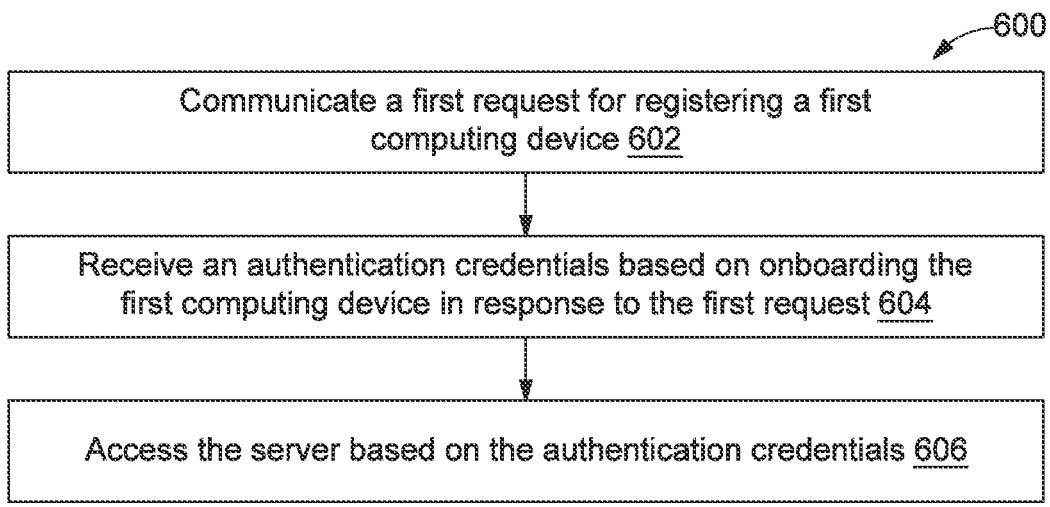
FIG. 6 illustrates a flow diagram of an exemplary process of onboarding a user of a first computing device, in accordance with an exemplary embodiment of the present disclosure.

FIG. 6 is a flow diagram that illustrates an exemplary process 600 for onboarding a user of a first computing device, in accordance with an exemplary embodiment of the present disclosure. FIG. 6 is explained in conjunction with FIGS. 1, 2, 3, 4, and 5.

In order to generate the blockchain network as mentioned, via step 502, initially, at step 602, a first request may be communicated. In an embodiment, the first computing device 104 may communicate the first request to the server 102. In other words, the user (i.e., the network admin) of the first entity may send the first request to the server 102 using the first computing device 104. The first request may be sent for registering the first computing device 104 with the server 102. In other words, the user of the first computing device 104 may send the first request to the server 104 for enabling access of the data managing platform 208 integrated with the server 102, to the user of the first computing device 104.

Once the first request is communicated, at step 604, an authentication credentials may be received by the first computing device 104 from the server 102. In an embodiment, the authentication credentials may be received based on onboarding the first computing device 104 in response to the first request received from the first computing device 104. In other words, the user of the first computing device 104 may receive the authentication credentials from the server 102, once the server 102 provides the access of the data managing platform to the user of the first computing device 104. In an embodiment, the authentication credentials may include one of a username and a password, a digital token, and a digital certificate. It should be noted that the authentication credentials are not limited to these and may include any form of unique details (such as, biometric, facial recognition, etc.) associated with the user of the first computing device 104 that is used to verify identity of the user.

Upon receiving the authentication credentials, at step 606, the first computing device 104 may be able to access the server 102 based on the received authentication credentials. By way of an example, once the user of first computing device 104 receives the authentication credentials (for example: a username and a password), then the user may login into the data managing platform 208 integrated with the server 102 based on the authentication credentials received while onboarding. For example, in order to access the data managing platform 208, the user may sign-in with the data managing platform 208 via the first computing device 104 using associated details such as, name, date of birth, email ID, and the like.

In order to sign-in, the user using his first computing device 104 may register himself with the data managing platform 208. Further, during the sign-in process, the data managing platform 208 may request the user of the first computing device 104 to generate the username and the password for accessing the data managing platform 208. Once the user signs-in with the data managing platform 208, the user may be able to access the data managing platform 208 via the first computing device 104 using the authentication credentials.

Figure 7:
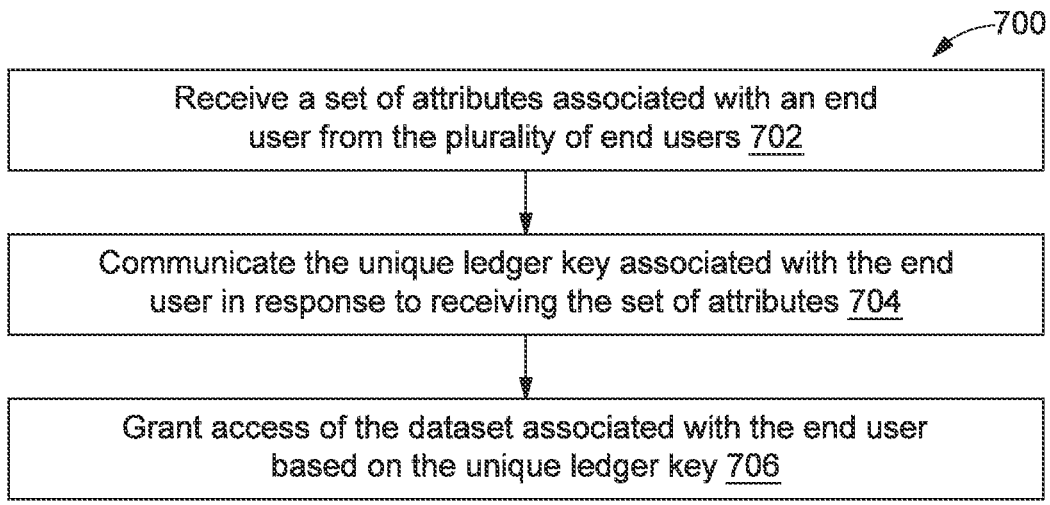
FIG. 7 illustrates a flow diagram of an exemplary process for enabling access of a dataset associated with an end user to a second computing device, in accordance with an exemplary embodiment of the present disclosure.

FIG. 7 is a flow diagram that illustrates an exemplary process 700 for enabling access of a dataset associated with an end user to a second computing device, in accordance with an exemplary embodiment of the present disclosure. FIG. 7 is explained in conjunction with elements from FIGS. 1, 2, 3, 4, 5, and 6. In an embodiment, the process 600 may be implemented by the server 102 and the second computing device 106.

In order to grant the access to the second computing device 106 as mentioned via step 512, initially, at step 702, a set of attributes associated with an end user from the plurality of end users may be received. The set of attributes associated with the end user may be received by the server 102 from the second computing device 106. In an embodiment, the access of the dataset associated with the end user may be provided to the second computing device 106, once the second computing device 106 joins the blockchain network generated by the first computing device 104.

Further, in order to access the dataset associated with the end user, initially, the end user may sign-up with the second computing device 106 using the set of attributes. In particular, the end user may login in the secondary application of the second entity. Examples of the set of attributes may include 'name', 'phone number', 'email', 'date of birth', and the like. Once the second computing device 106 receives the set of attributes associated with the end user from the end user, then the second computing device 106 may send the set of attributes associated with the end user to the server 102. In other words, the second computing device 102 may send the set of attributes associated with the end user to the data managing platform 208 integrated with the server 102.

Upon receiving the set of attributes associated with the end user, at step 704, the unique ledger key associated with the end user may be communicated by the server 102 to the secondary computing device 106. The unique ledger key may be required by the second computing device 106 to access the dataset associated with the end user. Further, at step 706, access to the dataset associated with the end user may be granted by the server 102 to the second computing device 106 based on the unique ledger key. In other words, the second computing device 106 may retrieve the dataset associated with the end user based on the unique ledger key received from the server 102.

Figure 8:
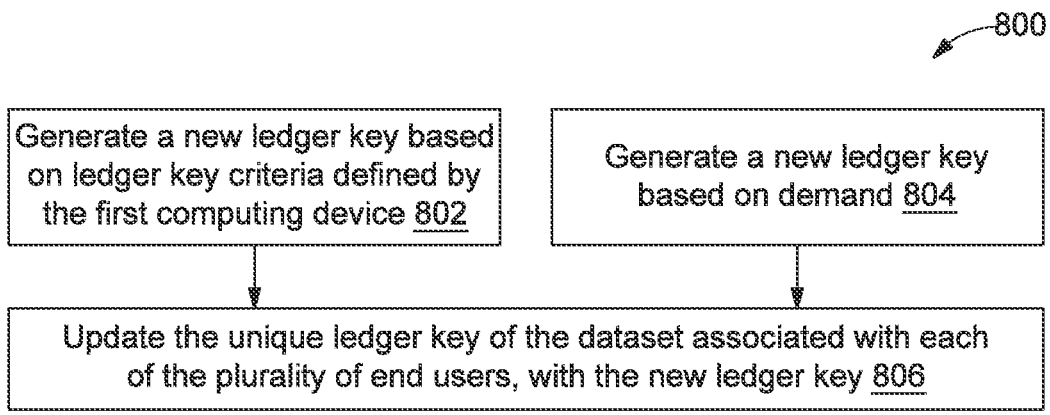
FIG. 8 illustrates a flow diagram of an exemplary process of generating and updating a unique ledger key of a dataset associated with an end user, in accordance with an exemplary embodiment of the present disclosure.

FIG. 8 is a flow diagram that illustrates an exemplary process 800 of generating and updating a unique ledger key of a dataset associated with an end user, in accordance with an exemplary embodiment of the present disclosure. FIG. 8 is explained in conjunction with elements from FIGS. 1, 2, 3, 4, 5, 6, and 7. In an embodiment, the process 800 may be implemented by the server 102.

In order to generate the unique ledger key for the dataset associated with each of the plurality of end users as mentioned via the step 506, initially, the user of the first computing device 104 may define ledger key criteria for generating the unique ledger key for each of the plurality of end users via the server 102. In other words, the user may define the ledger key criteria for generating the unique ledger key using the data managing platform 208. Further, in one embodiment, based on the ledger key criteria defined by the first computing device 104, at step 802, a new ledger key may be generated. In an embodiment, the new ledger key may be generated corresponding to the unique ledger key associated with the dataset of each of the plurality of end users. By way of an example, suppose the ledger key criteria defined by the first computing device 104 may be 'generate the new ledger key after a pre-defined time period, e.g., 'after 24 hours'. In this case, the server 102 may generate the new ledger key for the dataset associated with each of the plurality of end users after every 24 hours.

By way of another example, suppose the ledger key criteria defined by the first computing device 104 may be 'generate the new ledger key based on an update in the dataset associated with each of the plurality of end users'. In this case, the server 102 may generate the new ledger key for the dataset associated with each of the plurality of end users based on the update in the dataset of a corresponding end user of the plurality of end users. In another embodiment, at step 804, a new ledger key corresponding to the unique ledger key may be generated on demand of a user (i.e., the network admin) of the first computing device 104. In other words, the new ledger key corresponding to the dataset associated with each of the plurality of end users may be generated based on an input received from the user corresponding to the demand (or ledger key generation requirement) of the user. Once the new ledger key is generated by the server 102, then at step 806, the unique ledger key of the dataset associated with each of the plurality of end users may be updated with the new ledger key. In an embodiment, the unique ledger key may be updated with the new ledger key by the server 102.

Figure 9A:
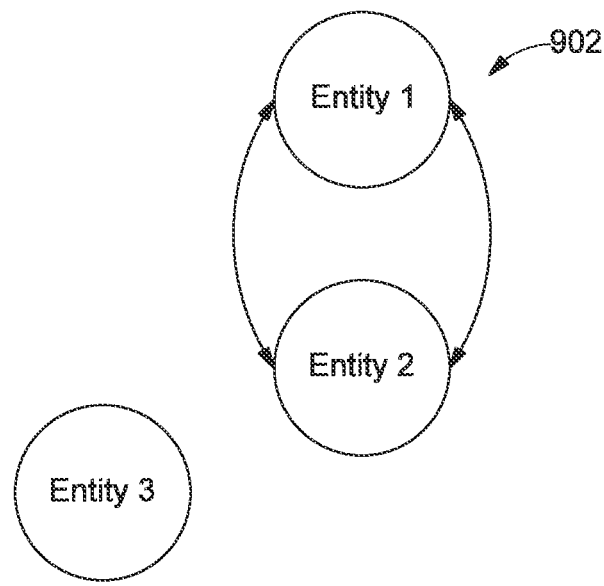
FIGS. 9A and 9B illustrate diagrams depicting joining of an entity C to an exemplary blockchain network, in accordance with an exemplary embodiment of the present disclosure.
Figure 9B:
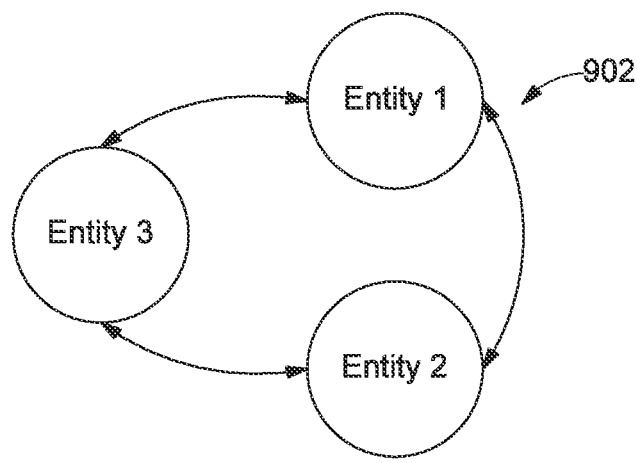

FIGS. 9A and 9B are diagrams that illustrate joining an entity 3 to an exemplary existing blockchain network 902, in accordance with an exemplary embodiment of the present disclosure. FIGS. 9A and 9B are explained in conjunction with elements from FIGS. 1, 2, 3, 4, 5, 6, 7, and 8.

In present FIG. 9A, the existing blockchain network 902 is depicted. As depicted, the existing blockchain network 902 includes two entities, i.e., an entity 1 and an entity 2. Now suppose, the entity 1 is the first entity that may have generated the existing blockchain network 902 using the data managing platform 208. Further, the entity 2 is the second entity that may have joined the existing blockchain network 902 generated by the entity 1, upon receiving the joining request from the entity 1 via the data managing platform 208. Once the entity 2 has joined the existing blockchain network 902, then the entity 2 may be able to access the dataset associated with the plurality of end users of the entity 1 stored in the blockchain ledger of the exemplary blockchain network 902.

Now suppose, a user of the entity 3 may be interested in joining the blockchain network 902 generated by the entity 1. In this case, the user (e.g., a client user) of the entity 3 may send a request for joining the existing blockchain network 902 of the entity 1 via the data managing platform 208. The user of the entity 3 may send the request for joining the blockchain network 902 to access the dataset associated with the plurality of end users of the entity 1 that is stored in the blockchain ledger of the existing blockchain network 902.

Upon receiving the request for joining the blockchain network 902, the user (i.e., the network admin) of the entity 1 may be able to accept or reject the request received form the entity C, based on his requirement via the data managing platform 208. In an embodiment, when the entity 1 has accepted the joining request received from the entity 3, then entity 3 may become part of the existing blockchain network 902 as depicted via FIG. 9B. Once the entity 3 is the part of the existing blockchain network 902, then the entity 3 may be able to access the dataset associated with the plurality of end users stored in the blockchain ledger using the unique ledger key corresponding to the dataset.

Figure 10A:
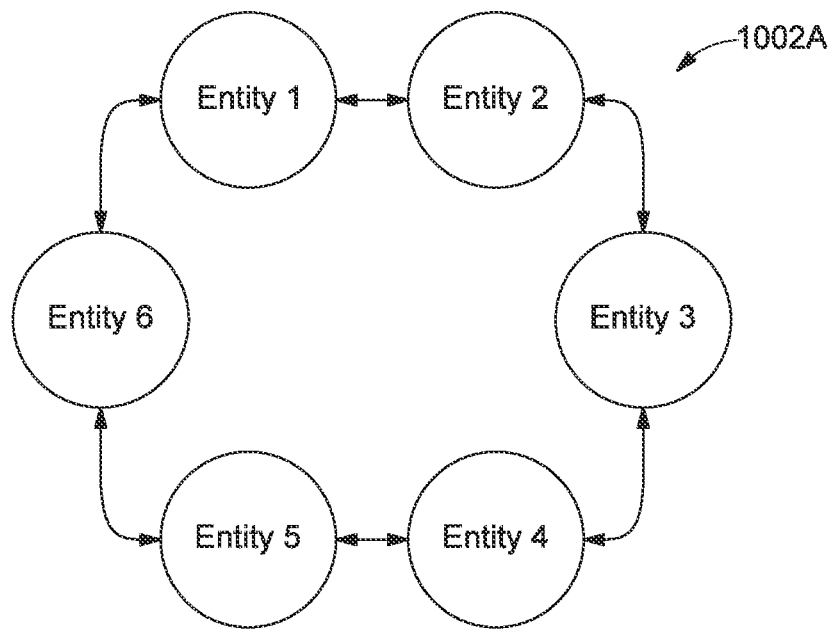
FIGS. 10A-10C illustrate a diagram depicting two exemplary blockchain networks, in accordance with an exemplary embodiment of the present disclosure.
Figure 10B:
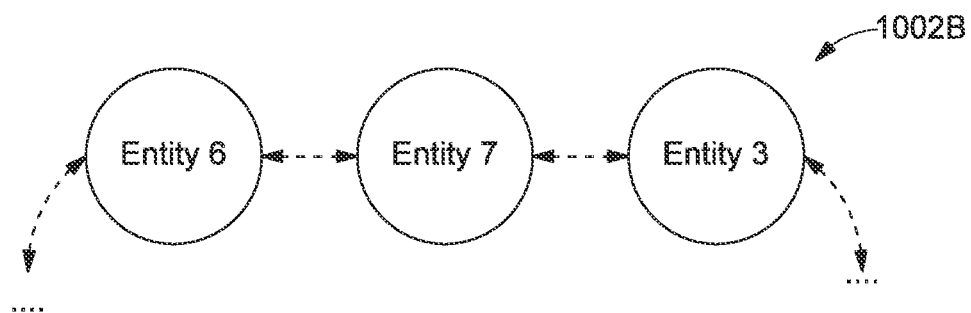
Figure 10C:
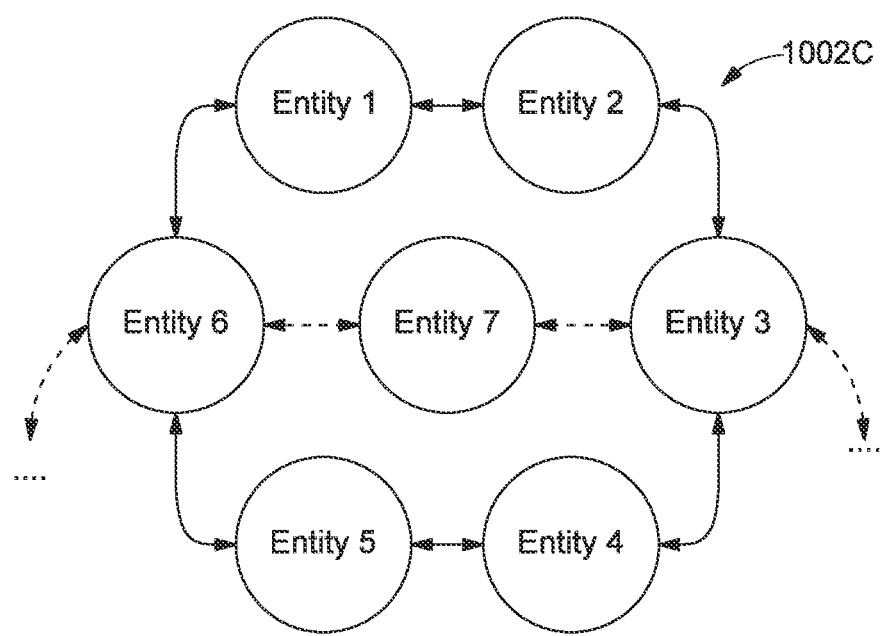

FIGS. 10A-10C is a diagram that illustrates two exemplary blockchain network 1002A and 1002B, in accordance with an exemplary embodiment of the present disclosure. FIGS. 10A-10C are explained in conjunction with elements from FIGS. 1, 2, 3, 4, 5, 6, 7, 8, and 9.

In FIG. 10A, the exemplary blockchain network 1002A is depicted. As depicted via FIG. 10A, the blockchain network 1002A may include six entities, i.e., entity 1, entity 2, entity 3, entity 4, entity 5, entity 6. Further, each of the six entities may be part of the blockchain network 1002A as depicted via solid lines. Now suppose, the blockchain network 1002A may be generated by a user of the entity 1. The user of the entity 1 may be a network admin of the blockchain network 1002A. With reference to FIG. 1, the entity 1 may correspond to first entity of the first computing device 104. Once the blockchain network 1002A is generated by the entity 1, remaining 5 entities, i.e., entity 2, entity 3, entity 4, entity 5, and entity 6 may be able to access the dataset associated with the plurality of end users that is stored in the blockchain ledger of the blockchain network 1002A. In order to access the dataset of an end user of the plurality of end users, each entity may require access of the unique ledger key associated with the dataset of the end user. In addition to accessing the dataset, in some embodiment, each of the six entities may be able to alter (i.e., update or change) the dataset of each of the plurality of end users based on information they receive for a corresponding end user while the end user may access a digital application associated with that entity.

Further, the user of the entity 1, being the network admin may be able to perform one or more functionalities, such as, define the ledger key criteria for generating the unique ledger key for the dataset associated with each of the plurality of end users, accepts or rejects the joining request received from a user of other entities (i.e., the one or more second entities), request the user of the other entities to join the generated blockchain network 1002A, and restrict visibility of the generated blockchain network to the user of other entities.

Further, in FIG. 10B, the exemplary blockchain network 1002B is depicted. As depicted via FIG. 10B, the blockchain network 1002B may include three entities, i.e., entity 3, entity 6, entity 7. Further, each of the three entities may be part of the blockchain network 1002B as depicted via dashed lines. In an embodiment, suppose the blockchain network 1002B may be generated by a user of the entity 7. In this case, the user of the entity 7 may be a network admin of the blockchain network 1002B. With reference to FIG. 1, the entity 7 may correspond to the first entity of the first computing device 104.

Further, as depicted via FIG. 10C, the entity 3 and entity 6 are the part of both blockchain networks, i.e., the blockchain network 1002A and the blockchain network 1002B. In other words, each entity may be part of any number of blockchain networks as depicted via 1002C. However, each of the two blockchain networks may be individually managed, using the data managing platform 208. In other words, the blockchain network 1002A may be managed by the user of the entity 1, whereas the blockchain network 1002B may be managed by the entity 7.

Further, in some embodiment, consider a scenario, where the user of the entity 1 may request the user of the entity 7 to join the blockchain network 1002B of the entity 7 with the blockchain network 1002A via the data managing platform 208. In this case, the user of the entity 1 may send (i.e., communicate) a network joining request, i.e., a request for combining the two blockchain networks, to the user of the entity 7 via the data managing platform 208. With reference to FIG. 1, the user of the entity 1 may send the joining request to the user of the entity 7 through the server 102 over the network 108. Further, the user of the entity 7 may accept or reject the network joining request received from the entity 1.

As will be also appreciated, the above-described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 11:
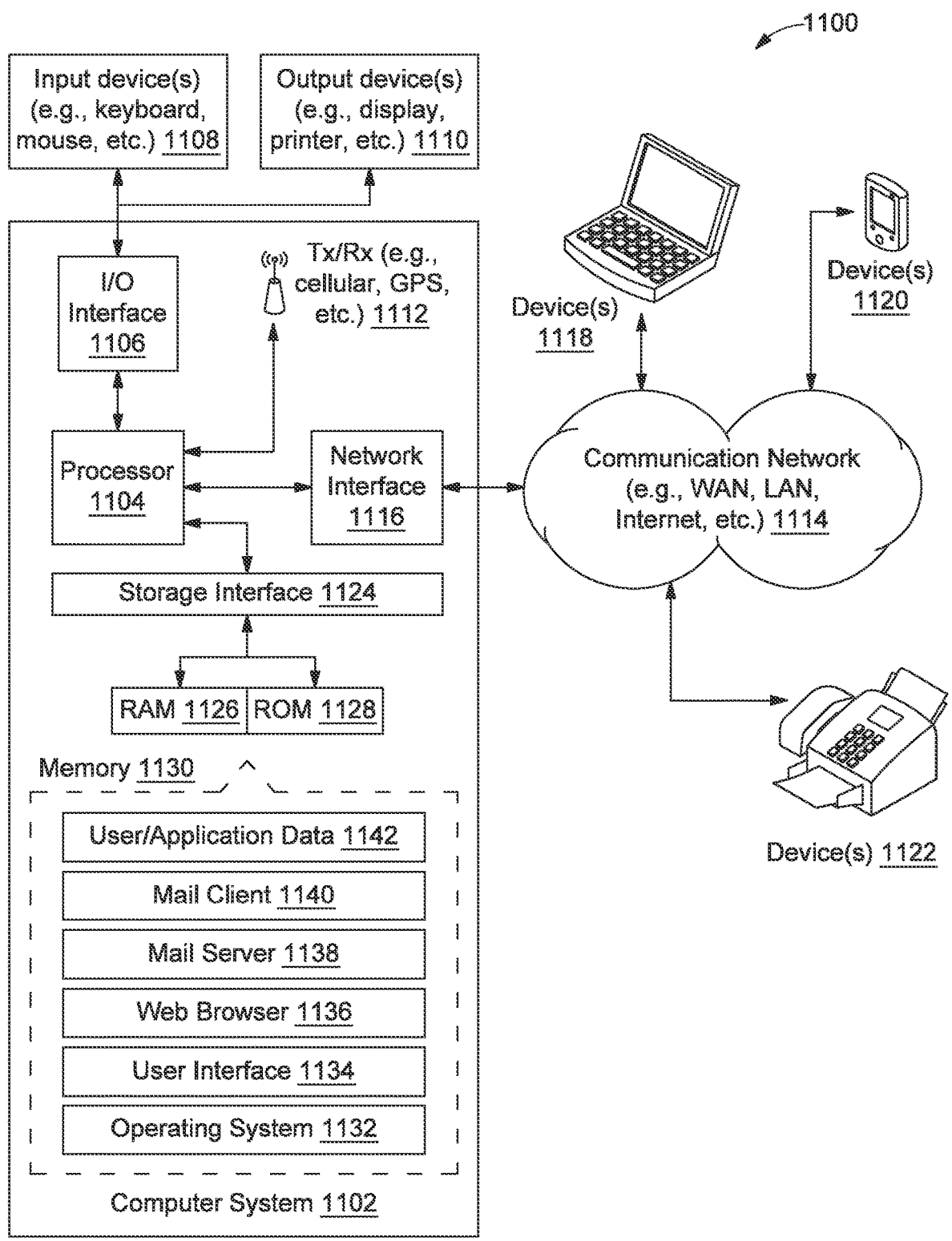
FIG. 11 is a block diagram that illustrates a system architecture of a computer system for managing anonymized data across computing devices in a blockchain network, in accordance with an exemplary embodiment of the present disclosure.

The disclosed methods and systems may be implemented on a conventional or a general-purpose computer system, such as a personal computer (PC) or server computer. FIG. 11 is a block diagram that illustrates a system architecture 1100 of a computer system 1102 for managing anonymized data across computing devices in a blockchain network, in accordance with an exemplary embodiment of the present disclosure. Variations of computer system 1102 may be used for implementing server 102 for managing anonymized data across computing devices in a blockchain network. Computer system 1102 may include a central processing unit ("CPU" or "processor") 1104. Processor 1104 may include at least one data processor for executing program components for executing user or system-generated requests. A user may include a person, a person using a device, such as those included in this disclosure, or such a device itself. Processor 1104 may include specialized processing units such as integrated system (bus) controllers, memory management control units, floating point units, graphics processing units, digital signal processing units, etc. Processor 1104 may include a microprocessor, such as AMD® ATHLOM® microprocessor, DURON® microprocessor OR OPTERON® microprocessor ARM's application, embedded or secure processors, IBM® POWERPC®, INTEL'S CORE® processor, ITANIUM® processor, XEON® processor, CELERON® processor or other line of processors. Processor 1104 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1104 may be disposed in communication with one or more input/output (I/O) devices via an I/O interface 1106. The I/O interface 1106 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMAX, or the like), etc.

Using I/O interface 1106, computer system 1102 may communicate with one or more I/O devices. For example, an input device 1108 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 1110 may be a printer, fax machine, video display (for example, cathode ray tube (CRT), liquid crystal display (LCD), light-emitting diode (LED), plasma, or the like), audio speaker, etc. In some embodiments, a transceiver 1112 may be disposed in connection with processor 1104. Transceiver 1112 may facilitate various types of wireless transmission or reception. For example, transceiver 1112 may include an antenna operatively connected to a transceiver chip (for example, TEXAS INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 1104 may be disposed in communication with a communication network 1114 via a network interface 1116. Network interface 1116 may communicate with communication network 1114. Network interface 1116 may employ connection protocols including, without limitation, direct connect, Ethernet (for example, twisted pair 10/100/1000 Base T), transmission control protocol/internet protocol (TCP/IP), token ring, IEEE 802.11a/b/g/n/x, etc. Communication network 1114 may include, without limitation, a direct interconnection, local area network (LAN), wide area network (WAN), wireless network (for example, using Wireless Application Protocol), the Internet, etc. Using network interface 1116 and communication network 1114, computer system 1102 may communicate with devices 1118, 1120, and 1122. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® reader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 1102 may itself embody one or more of these devices.

In some embodiments, processor 1104 may be disposed in communication with one or more memory devices (for example, RAM 1126, ROM 1128, etc.) via a storage interface 1124. Storage interface 1124 may connect to memory 1130 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 1130 may store a collection of program or database components, including, without limitation, an operating system 1132, user interface application 1134, web browser 1136, mail server 1138, mail client 1140, user/application data 1142 (for example, any data variables or data records discussed in this disclosure), etc. Operating system 1132 may facilitate resource management and operation of computer system 1102. Examples of operating systems 1132 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 1134 may facilitate display, execution, interaction, manipulation, or operation of program components through textual or graphical facilities. For example, user interfaces may provide computer interaction interface elements on a display system operatively connected to computer system 1102, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO' platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 1102 may implement a web browser 1136 stored program component. Web browser 1136 may be a hypertext viewing application, such as MICROSOFT® INTERNET EXPLORER® web browser, GOOGLE® CHROME® web browser, MOZILLA FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 1102 may implement a mail server 1138 stored program component. Mail server 1138 may be an Internet mail server such as MICROSOFT® EXCHANGE® mail server, or the like. Mail server 1138 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 1138 may utilize communication protocols such as internet message access protocol (IMAP), messaging application programming interface (MAPI), Microsoft Exchange, post office protocol (POP), simple mail transfer protocol (SMTP), or the like. In some embodiments, computer system 1102 may implement a mail client 1140 stored program component. Mail client 1140 may be a mail viewing application, such as APPLE MAIL® mail-client, MICROSOFT ENTOURAGE® mail client, MICROSOFT OUTLOOK® mail client, MOZILLA THUNDERBIRD® mail client, etc.

In some embodiments, computer system 1102 may store user/application data 1142, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

Thus, the disclosed method and system try to overcome the technical problem of managing anonymized data across computing devices in a blockchain network. The disclosed method and system may generate a blockchain network including a blockchain ledger based on a dataset associated with each of a plurality of end users. The dataset associated with each of the plurality of end users may be associated with a first computing device (i.e., the first computing device 104). To generate the blockchain network, the disclosed method and the system may construct the blockchain ledger corresponding to the dataset associated with each of the plurality of end users based on a set of customization settings and one or more criteria. The one or more criteria may be defined by the first computing device. Further, to generate the blockchain network, the disclosed method and the system may generate a unique ledger key corresponding to the dataset associated with each of the plurality of end users, and store the dataset associated with each of the plurality of end users in the blockchain ledger based on the unique ledger key. Further, the method and system may communicate a joining request to a second computing device for joining the blockchain network. Further, the method and system may grant access to the second computing device to the dataset associated with the plurality of end users.

As will be appreciated by those skilled in the art, the techniques described in the various embodiments discussed above are not routine, or conventional, or well understood in art. The techniques discussed above provide managing intelligent exchange of anonymized data (i.e., the dataset of the end user) across multiple computing devices of different entities. The above discussed techniques may enable entities to generate their own blockchain network to perform intelligent exchange of end users' data (i.e., customer data) with other entities. Further, the technique may enable entities to provide accurate relevant product recommendations to end users by adhering to consumer privacy across all digital touchpoints (i.e., different digital applications). The discussed techniques may provide exclusive experience to customers across all digital touchpoints by respecting consumer privacy across all digital touchpoints. In addition, the techniques may enable creation of consortiums (i.e., via blockchain networks) on fly with minimal operational overhead that will allow partners (i.e., one or more second entities) to collaborate and build newer services and products that are relevant for the customer.

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described a method and system for managing anonymized data across computing devices in the blockchain network. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

We claim:

1. A method of managing anonymized data across computing devices in a blockchain network, comprising:
   generating, by a first computing device via a server, the blockchain network comprising a blockchain ledger based on a dataset associated with each of a plurality of end users, wherein the dataset associated with each of the plurality of end users is associated with the first computing device, and wherein generating the blockchain network comprises:
   constructing, by the first computing device, the blockchain ledger corresponding to the dataset associated with each of the plurality of end users based on a set of customization settings and one or more criteria, wherein the one or more criteria are defined by the first computing device;
   generating, by the first computing device, a unique ledger key corresponding to the dataset associated with each of the plurality of end users; and
   storing, by the first computing device, the dataset associated with each of the plurality of end users in the blockchain ledger based on the unique ledger key;
   communicating, by the first computing device via the server, a joining request to a second computing device for joining the blockchain network; and
   granting, by the first computing device via the server, access to the second computing device to the dataset associated with the plurality of end users, wherein the set of customization settings comprises:
   a first customization setting to configure the blockchain ledger,
   a second customization setting to configure a bootstrapping process,
   a third customization setting to initiate the bootstrapping process,
   a fourth customization setting to configure the unique ledger key based on a set of pre-set attributes,
   a fifth customization setting to rotate the unique ledger key,
   a sixth customization setting to rebuild the blockchain network,
   a seventh customization setting to capture a subset from the dataset corresponding to one or more blockchain ledgers,
   an eighth customization setting to combine two or more blockchain ledgers,
   a ninth customization setting to retrieve one or more subsets from the dataset associated with each of the plurality of end users from the blockchain ledger, and
   a tenth customization setting to customize application logic.

2. The method of claim 1, further comprising:
   communicating, by the first computing device to the server, a first request for registering the first computing device; and
   receiving, by the first computing device from the server, a set of authentication credentials based on onboarding of the first computing device in response to the first request.

3. The method of claim 2, wherein the set of authentication credentials includes at least one of a username and a password, a digital token, or a digital certificate.

4. The method of claim 2, further comprising:
   accessing, by the first computing device, the server based on the set of authentication credentials.

5. The method of claim 1, wherein the dataset corresponding to the plurality of end users is retrieved by the first computing device from a plurality of data sources.

6. The method of claim 5, wherein the plurality of data sources comprise at least two of a point of sale (POS) data source, a demographic data source, web activity, social media activity, or online surveys.

7. The method of claim 1, further comprising:
structuring, by the first computing device, the blockchain ledger based on the set of customization settings and the one or more criteria.

8. The method of claim 1, further comprising:
receiving, by the server, a set of attributes associated with an end user from the plurality of end users;
communicating, by the server, the unique ledger key associated with the end user based on the reception of the set of attributes; and
granting, by the server, access to the dataset associated with the end user based on the unique ledger key.

9. The method of claim 1, further comprising:
generating, by the server, a new ledger key based on ledger key criteria defined by the first computing device; and
updating, by the server, the unique ledger key of the dataset associated with each of the plurality of end users, with the new ledger key.

10. A system for managing anonymized data across computing devices in a blockchain network, the system comprising:
a processing circuitry; and
a memory communicatively coupled to the processing circuitry, wherein the memory stores processor instructions, which when executed by the processing circuitry, cause the processing circuitry to:
generate the blockchain network comprising a blockchain ledger based on a dataset associated with each of a plurality of end users, wherein the dataset associated with each of the plurality of end users is associated with a first computing device, and wherein, to generate the blockchain network, the processor instructions, on execution, further causes the processing circuitry to:
construct the blockchain ledger corresponding to the dataset associated with each of the plurality of end users based on a set of customization settings and one or more criteria, wherein the one or more criteria are defined by the first computing device;
generate a unique ledger key corresponding to the dataset associated with each of the plurality of end users; and
store the dataset associated with each of the plurality of end users in the blockchain ledger based on the unique ledger key;
communicate a joining request to a second computing device for joining the blockchain network; and
grant access to the second computing device to the dataset associated with the plurality of end users, wherein the set of customization settings comprises:
a first customization setting to configure the blockchain ledger,
a second customization setting to configure a bootstrapping process,
a third customization setting to initiate the bootstrapping process,
a fourth customization setting to configure the unique ledger key based on a set of pre-set attributes,
a fifth customization setting to rotate the unique ledger key,
a sixth customization setting to rebuild the blockchain network,
a seventh customization setting to capture a subset from the dataset corresponding to one or more blockchain ledgers,
an eighth customization setting to combine two or more blockchain ledgers,
a ninth customization setting to retrieve one or more subsets from the dataset associated with each of the plurality of end users from the blockchain ledger, and
a tenth customization setting to customize application logic.

11. The system of claim 10, wherein the processor instructions, on execution, further cause the processing circuitry to:
communicate, to a server, a first request for registering the first computing device; and
receive a set of authentication credentials, from the server, based on onboarding of the first computing device in response to the first request.

12. The system of claim 11, wherein the set of authentication credentials includes at least one of a username and a password, a digital token, or a digital certificate.

13. The system of claim 11, wherein the processor instructions, on execution, further cause the processing circuitry to access the server based on the set of authentication credentials.

14. The system of claim 10, wherein the dataset corresponding to the plurality of end users is retrieved by the first computing device from a plurality of data sources.

15. The system of claim 14, wherein the plurality of data sources at least two of a point of sale (POS) data source, a demographic data source, web activity, social media activity, or online surveys.

16. The system of claim 10, wherein the processor instructions, on execution, further cause the processing circuitry to:
structure the blockchain ledger based on the set of customization settings and the one or more criteria.

17. The system of claim 10, wherein the processor instructions, on execution, further cause the processing circuitry to:
receive a set of attributes associated with an end user from the plurality of end users;
communicate the unique ledger key associated with the end user based on the reception of the set of attributes; and
grant access to the dataset associated with the end user based on the unique ledger key.

18. The system of claim 10, wherein the processor instructions, on execution, further cause the processing circuitry to:
generate a new ledger key based on ledger key criteria defined by the first computing device; and
update the unique ledger key of the dataset associated with each of the plurality of end users, with the new ledger key.

* * * * *